Patented May 27, 1952

2,598,636

UNITED STATES PATENT OFFICE 2,598,636

PLASTICIZED VINYL CHLORIDE POLYMER

Joachim Dazzi, Dayton, Ohio, assignor to Monsanto Chemical Company, St. Louis, Mo., a corporation of Delaware No Drawing. Application September 25, 1950, Serial No. 186,680

6 Claims. (Cl. 260—31.8)

This invention relates to compositions comprising polymers of vinyl halides and relates more particularly to compositions comprising polymers plasticized with adducts of certain aconitates and esters of certain higher fatty acids.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition, such as low volatility, color and heat stability, water absorption, etc.

Now I have found that very good flexibility without sacrifice of temperature stability and low volatiilty is imparted to vinyl chloride polymers when there are employed as plasticizers addition products of certain trialkyl or tris(alkoxyalkyl) aconitates and esters of unsaturated, non-hydroxylated, non-conjugated fatty acids having from 10 to 24 carbon atoms. Addition products of this type are broadly disclosed in the Clocker Patent No. 2,188,888. Briefly, they are obtainable by the addition reaction of an aconitate with higher fatty acids or esters thereof.

The addition products which I have found to be particularly valuable as plasticizers for vinyl chloride polymers have the general formula

T.CH₂.COOY
|
CH.COOR
|
CH.COOR
|
CH₂.COOR in which T is an alkenyl radical of from 8 to 22 carbon atoms and Y and R are selected from the class consisting of alkyl and alkoxyalkyl radicals of from 1 to 8 carbon atoms.

Esters of aconitic acid which may be reacted with the higher fatty acid esters to yield the present carboxylates have the general formula

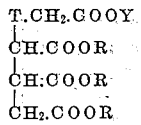

in which R is selected from the class consisting of alkyl and alkoxyalkyl radicals of from 1 to 8 carbon atoms. As illustrative of useful esters may be mentioned trimethyl, triethyl, tributyl, triamyl, tris(2-ethylhexyl), trioctyl, tris(2-methoxyethyl) or tris(2-butoxyethyl) aconitate.

Higher unsaturated fatty acid esters useful in preparing the present addition products have the general formula T.CH₂COOY, in which T is an alkenyl radical of from 8 to 22 carbon atoms and Y is selected from the class consisting of alkyl and alkoxyalkyl radicals of from 1 to 8 carbon atoms. As illustrative of esters having this general formula may be mentioned methyl, isopropyl, isoamyl, hexyl, or 2-ethoxyethyl undecenylate and ethyl, butyl, tert-amyl or 2-methoxybutyl oleate.

While isomeric products are possible, and the position to which the aconitate residue is attached to the fatty acid esters is not known, the reaction, of, e. g., methyl undecenylate and a trialkyl aconitate such as trimethyl aconitate proceeds probably according to the scheme:

CH₂:CHCH₂(CH₂)₆CH₂COOCH₃ + CH₂COOCH₃ ⟶

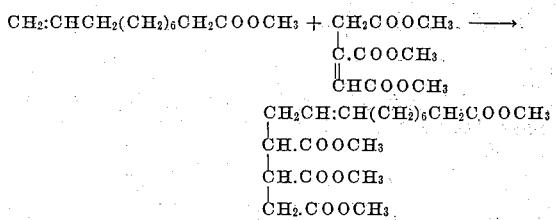

Because of uncertainty concerning the position from which the aconitate residue is attached to the higher alkenyl radical of the fatty acid ester, the present adducts will be hereinafter referred to as (1′,2′,3′-tricarboxypropyl) derivatives of the fatty acid ester without stipulating the position at which the tricarboxypropyl radical is attached.

The present adducts are valuable plasticizers for polyvinyl chloride and copolymers of at least 70 per cent by weight of vinyl chloride and up to 30 per cent by weight of an unsaturated monomer copolymerized therewith, for example vinyl acetate, vinylidene chloride, etc. Adducts of acyclic olefinic acids and long-chained unsaturated acids have been hitherto generally suggested for use as softening agents. I have now found, however, that the aconitate-fatty acid ester adducts are of outstanding value as plasticizers, these adducts serving not only to soften vinyl chloride polymers, but also to impart simultaneously low temperature flexibility, extremely good temperature stability and great mechanical strength to these polymers. While many of the esters described in the prior art are incompatible with polymers and copolymers of vinyl chloride, and do not give continuous, homogenous compositions, the present aconitate-fatty acid ester adducts are compatible with vinyl chloride polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. The value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

The invention is further illustrated, but not limited, by the following example:

Example

A 1:1 addition product of triethyl aconitate and ethyl oleate was prepared as follows: A mixture consisting of 0.4 mole of ethyl oleate and 1.0 mole of triethyl aconitate was heated at a temperature of 230° C. to 242° C. for about 20 hours. After distillation of the resulting reaction product to remove material boiling below 210° C./0.4 to 1.0 ml. Hg pressure, there was obtained as residue the substantially pure adduct, tetraethyl (1',2',3'-tricarboxypropyl) oleate.

Evaluation of this adduct as a polyvinyl chloride plasticizer was made by employing the testing procedures described above. Sixty parts of polyvinyl chloride and 40 parts by weight of the tetraethyl (1',2',3'-tricarboxypropyl) oleate prepared above were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 3° C. which value denotes good low temperature properties. Tests on the volatility characteristics of the plasticized composition gave a value of 0.5 per cent which shows extremely good retention of plasticizer and indicates good high temperature characteristics of the composition. The plasticized material had a hardness of 83 before the volatility test and a hardness of 82 after the volatility test. When subjected to heat at a temperature of 325° F. for a period of 30 minutes the clarity and color of the molded product was substantially unchanged. Tests of the water resistance properties of the plasticized material employing the test procedure described above showed a solids-loss of only 0.03 per cent and an 0.44 per cent water absorption value.

Instead of the adduct employed above other adducts of trialkyl or tris(alkoxyalkyl) aconitates in which each alkyl or alkoxyalkyl radical has from 1 to 8 carbon atoms and alkyl or alkoxyalkyl esters of mono-olefinic, non-hydroxylated fatty acids give similarly valuable polyvinyl chloride compositions. Thus by employing 40 parts by weight of an adduct of the trimethyl, triisoamyl, tris(2-ethoxyethyl) or tris(3-methoxypropyl) aconitate and an oleate or undecylenate such as isobutyl oleate or 2-methoxyethyl undecylenate, with 60 parts by weight of polyvinyl chloride, or with 60 parts by weight of a vinyl chloride-vinyl acetate copolymer, there are obtained clear, colorless compositions of very good flexibility and stability.

While the above example shows only a composition in which the ratio of plasticizer to polymer content is 40:60, the content of adduct to polyvinyl chloride may be widely varied, depending upon the properties desired in the final product. For many purposes a plasticizer content of, say, from only 10 per cent to 20 per cent is preferred. The present adducts are compatible with polyvinyl chloride over a wide range of concentration, up to 50 per cent of adduct based on the total weight of the plasticized composition yielding desirable products.

Although the invention has been described particularly with reference to the use of the present aconitate adducts as plasticizers for polyvinyl chloride, these adducts are advantageously employed also as plasticizers for copolymers of vinyl chloride, for example the copolymers of vinyl chloride with vinyl acetate, vinylidene chloride, methyl methacrylate and acrylonitrile. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present aconitate adducts are substantially unreactive with the commercially available heat and light stabilizers which are commonly employed with polyvinyl chloride or copolymers thereof, the presence of such materials in the plasticized materials does not impair the valuable properties of the adducts. The present adducts are of general utility in plasticizing vinyl chloride polymers. They may be used as the only plasticizing component in a compounded vinyl chloride polymer or they may be used in conjunction with other plasticizers.

What I claim is:

1. A resinous composition comprising a vinyl chloride polymer plasticized with a tetracarboxylate in which 1 mole of an aconitate selected from the class consisting of simple trialkyl aconitates and simple tris(alkoxyalkyl) aconitates in which each alkyl radical and each alkoxyalkyl radical has from 1 to 8 carbon atoms, is combined at the acid portion of one mole of an ester selected from the class consisting of alkyl and alkoxyalkyl esters of non-conjugated, unsaturated, non-hydroxylated fatty acids of from 10 to 24 carbon atoms in which each alkyl radical and each alkoxyalkyl radical has from 1 to 8 carbon atoms.

2. A resinous composition comprising a polyvinyl chloride polymer plasticized with a tetracarboxylate in which 1 mole of an aconitate selected from the class consisting of simple trialkyl aconitates and simple tris(alkoxyalkyl) aconitates in which each alkyl radical and each alkoxyalkyl radical has from 1 to 8 carbon atoms, is combined at the acid portion of one mole of an ester selected from the class consisting of alkyl and alkoxyalkyl esters of non-conjugated, unsaturated, non-hydroxylated fatty acids of from 10 to 24 carbon atoms in which each alkyl radical and each alkoxyalkyl radical has from 1 to 8 carbon atoms.

3. A resinous composition comprising a polyvinyl chloride plasticized with a tetracarboxylate in which 1 mole of a simple trialkyl aconitate in which each alkyl radical has from 1 to 8 carbon atoms, is combined at the acid portion of one mole of an alkyl ester of a non-conjugated, unsaturated, non-hydroxylated fatty acid of from 10 to 24 carbon atoms in which the alkyl radical has from 1 to 8 carbon atoms, said tetracarboxylate being from 5 to 50 per cent of the weight of the composition.

4. A resinous composition comprising a polyvinyl chloride plasticized with a tetracarboxylate in which 1 mole of a simple trialkyl aconitate in which each alkyl radical has from 1 to 8 carbon atoms, is combined at the acid portion of 1 mole of an alkyl oleate in which the alkyl radical has from 1 to 8 carbon atoms, said tetracarboxylate being from 5 to 50 per cent by weight of the composition.

5. A resinous composition comprising a polyvinyl chloride plasticized with a tetracarboxylate in which 1 mole of a simple trialkyl aconitate in which each alkyl radical has from 1 to 8 carbon atoms, is combined at the acid portion of 1 mole of an alkyl undecylenate in which the akyl radical has from 1 to 8 carbon atoms, said tetracarboxylate being from 5 to 50 per cent by weight of the composition.

6. A resinous composition comprising a polyvinyl chloride plasticized with a tetracarboxylate in which 1 mole of triethyl aconitate is combined at the acid portion of 1 mole of ethyl oleate, said tetracarboxylate being from 5 to 50 per cent by weight of the composition.

JOACHIM DAZZI.

No references cited.